(12) United States Patent
Lee et al.

(10) Patent No.: US 8,296,064 B2
(45) Date of Patent: Oct. 23, 2012

(54) PATH SEARCH METHOD

(75) Inventors: Jae-Yeong Lee, Daejeon (KR); Won Pil Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 200 days.

(21) Appl. No.: 12/667,407

(22) PCT Filed: Dec. 17, 2007

(86) PCT No.: PCT/KR2007/006578
§ 371 (c)(1),
(2), (4) Date: Dec. 31, 2009

(87) PCT Pub. No.: WO2009/005188
PCT Pub. Date: Jan. 8, 2009

(65) Prior Publication Data
US 2011/0010083 A1  Jan. 13, 2011

(30) Foreign Application Priority Data

Jul. 3, 2007  (KR) .................... 10-2007-0066477

(51) Int. Cl.
*G01C 21/00* (2006.01)
(52) U.S. Cl. ...................................................... 701/450
(58) Field of Classification Search .......... 701/200–202, 701/223, 206
See application file for complete search history.

(56) References Cited

U.S. PATENT DOCUMENTS

| | | | | |
|---|---|---|---|---|
| 6,175,804 B1* | 1/2001 | Szczerba | .................. | 701/209 |
| 6,182,007 B1* | 1/2001 | Szczerba | .................. | 701/202 |
| 7,953,551 B2* | 5/2011 | Park et al. | ................. | 701/209 |
| 2006/0025888 A1* | 2/2006 | Gutmann et al. | ............ | 700/245 |
| 2007/0083557 A1* | 4/2007 | Leiserowitz et al. | ...... | 707/104.1 |
| 2007/0268852 A1* | 11/2007 | Stegmaier et al. | ............ | 370/328 |
| 2008/0009965 A1* | 1/2008 | Bruemmer et al. | ........... | 700/245 |
| 2008/0294338 A1 | 11/2008 | Doh et al. | | |
| 2009/0248378 A1* | 10/2009 | Li et al. | ........................... | 703/10 |

FOREIGN PATENT DOCUMENTS

| | | |
|---|---|---|
| JP | 8-334375 | 12/1996 |
| JP | 11-085273 | 3/1999 |
| KR | 10-20050111138 | 11/2005 |
| KR | 10-0611328 | 8/2006 |
| KR | 10-20060109774 | 10/2006 |
| KR | 10-20070060954 | 6/2007 |

OTHER PUBLICATIONS

"Anytime Dynamic A: An Anytime, Replanning Algorithm", Maxim LIKACHEV, et al., Proceedings of the International Conference on Automated Planning and Scheduling, Jun. 2005.
"Randomized Kinodynamic Planning", Steven M. Lavalle, et al., Proceedings of IEEE International Conference on Robotics and Automation, vol. 1, 1999, pp. 473-479.
International Search Report issued on Apr. 3, 2008 in corresponding PCT Application No. PCT/KR2007/006578.

* cited by examiner

*Primary Examiner* — Hussein A. Elchanti
(74) *Attorney, Agent, or Firm* — Staas & Halsey LLP

(57) ABSTRACT

A path search method of a mobile object in a grid map having a plurality of cells, each having an identical size, is provided. The path search method includes: generating a block map having a plurality of blocks by merging a specific number of cells in the grid map; obtaining a block path by finding a path from a starting position to a destination position in the block map; and obtaining a final path of the mobile object by performing a cell-based path search on cells in the blocks on the block path.

8 Claims, 3 Drawing Sheets

[Fig. 1]
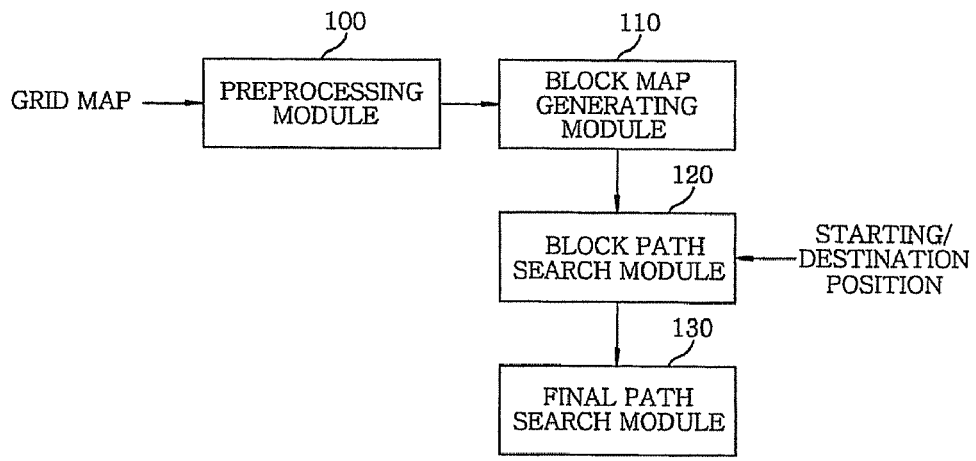
[Fig. 2]
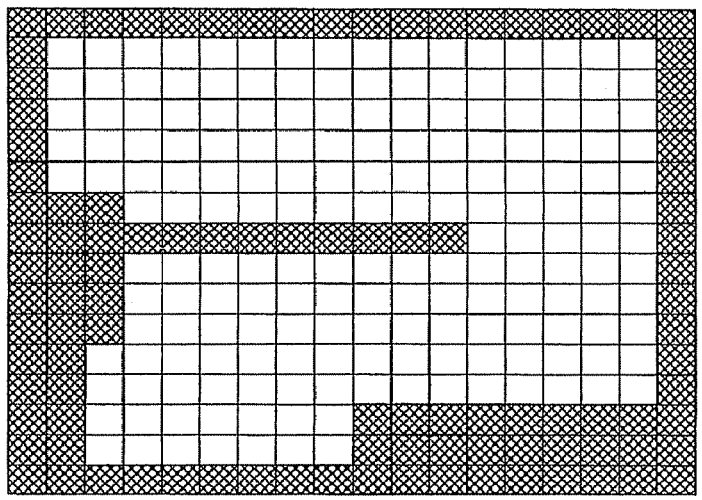
[Fig. 3]
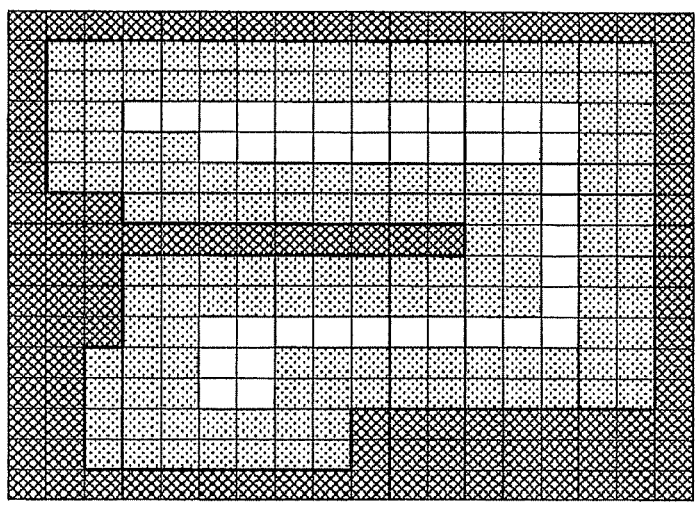

[Fig. 4]
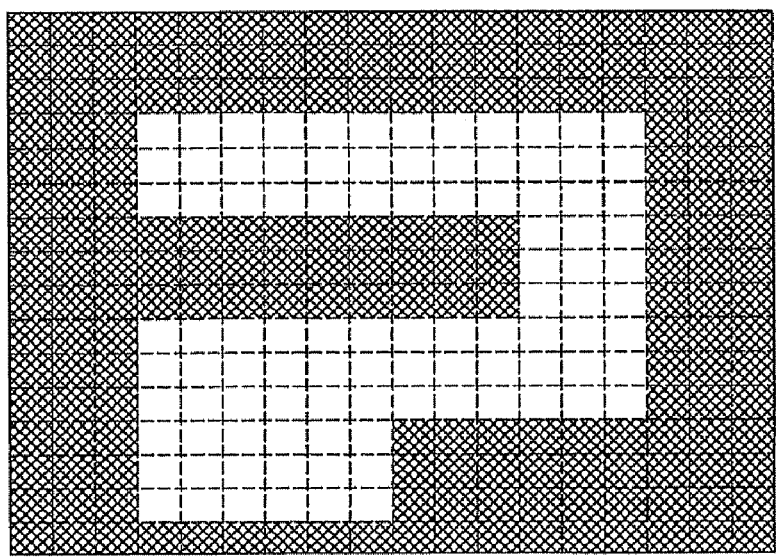
[Fig. 5]
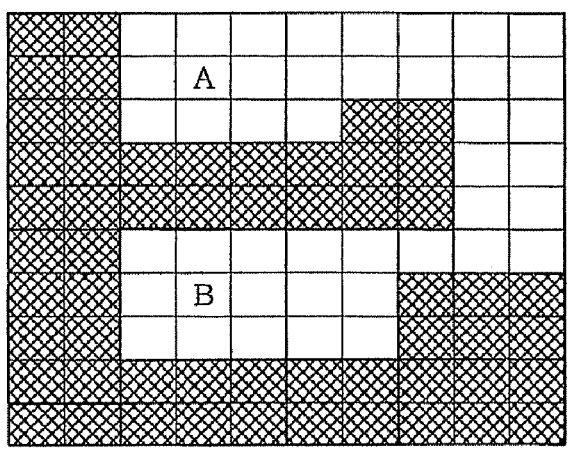
[Fig. 6]
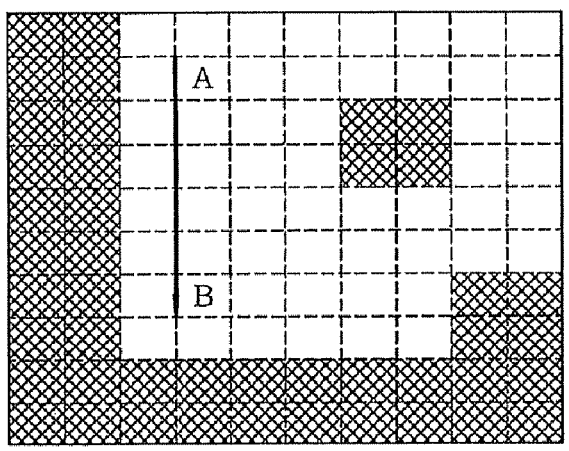

[Fig. 7]
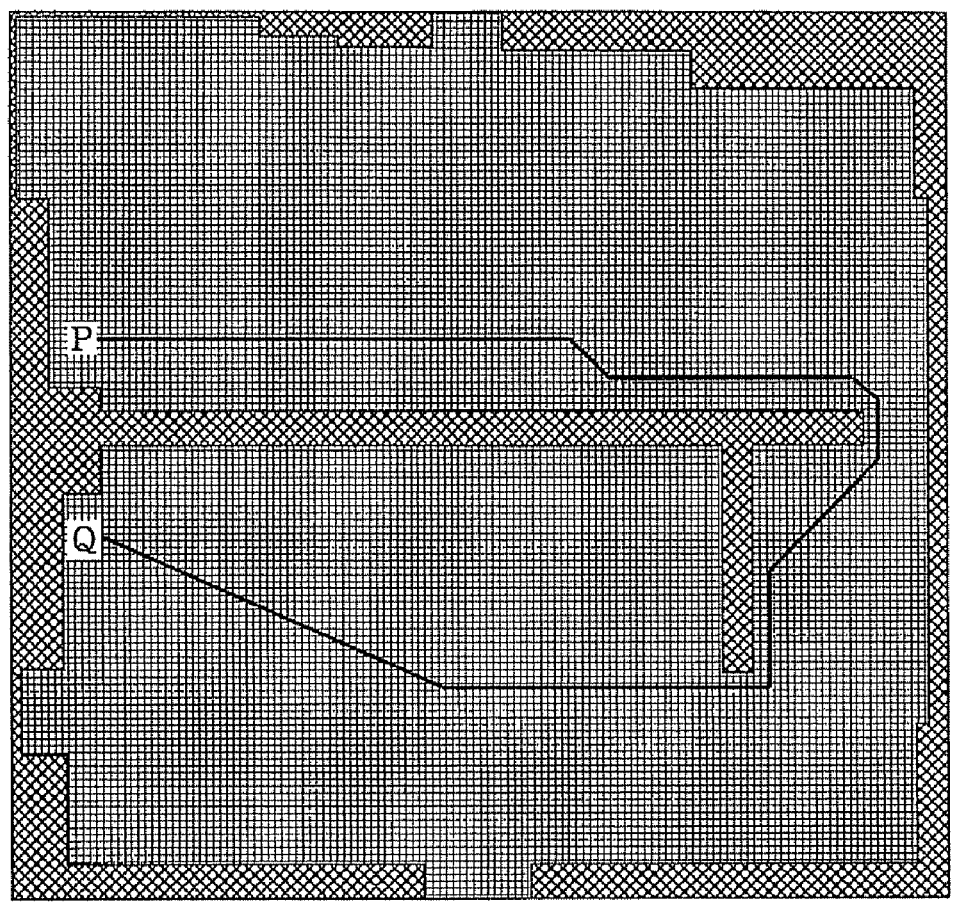

PATH SEARCH METHOD

Cross-Reference to Related Application

This application is a 371 National Stage Entry application of PCT/KR2007/006578, filed on Dec. 17, 2007, the entire contents are herewith incorporated by reference.

TECHNICAL FIELD

The present invention relates to a path search method of a mobile object; and more particularly, to a path search method of a mobile object in which a search time for an optimal path from a starting position to a destination position in a given grid map can be reduced using search space reduction.

This work was supported by the IT R&D program of MIC/IITA. [2005-S-033-03, Embedded Component Technology and Standardization for URC]

BACKGROUND ART

Path search is widely used in several areas, for example, to move a robot to a destination position for service provision, to move artificial intelligence units in a computer game, to determine a path of an unmanned surveillance plane, and the like. In path search algorithms, search time reduction and optimal path search are two major factors.

Meanwhile, real-time path search is required when a set path of a mobile object needs to be changed based on surrounding information detected while moving, due to incompleteness of given map information used in setting the path, an encounter with a mobile obstacle such as a person while moving along the set path, and a deviation from the set path caused by control errors, for example. In particular, when the mobile object encounters the mobile obstacle or when the given map information does not match with the surrounding information detected while the mobile object is actually moving, a delay in searching a new path may cause a delay in the movement of the mobile object. Thus, there is a need for a fast path search method.

Further, in computer games, fast path search algorithm is required in order to find and control paths of a number of units simultaneously.

A* algorithm based on a grid map is a conventional path search algorithm. The A* algorithm always secures to find an optimal path from a starting position to a destination position. However, it is difficult to use the A* algorithm in real-time path search due to its high computational cost.

Further, the A* algorithm has a drawback in that a path search time increases by geometric progression with an increase of a map size.

Researches have been made to improve a search time of the A* algorithm, and representative examples thereof include an Anytime A* algorithm and a Dynamic A* algorithm.

The Anytime A* algorithm was designed to find the best possible solution within a given time limit. In the Anytime A*, path search using the A* algorithm is first performed under relaxed best solution conditions to obtain a rough path, and then if the time remains, the path search is performed again under tightened best solution conditions in comparison with those used before to obtain a path nearer to the best solution than the path obtained before. In the Anytime A* algorithm, the path search using the A* algorithm would be repeatedly performed until the given time is used up.

In the Dynamic A* algorithm, a path from a starting position to a destination position is first found using the A* algorithm, and then, when the path needs to be changed due to an encounter with an obstacle while a robot is moving or the like, the path found before is partially modified, i.e., the path is reused, without searching the entire path again using the A* algorithm. This allows the mobile object to change its path quickly.

Though the above-described path search algorithms may reduce the search time to some extent, since the search time is reduced only to an integral multiple thereof, they still have the drawback in that the search time increases by geometric progression with an increase of a map size. This drawback still remains in the Anytime A* algorithm no matter how the best solution conditions for use in the first path search are greatly relaxed.

Further, in the Dynamic A* algorithm, a new path is required to be found whenever the destination position is changed, and, thus, it is difficult to apply the Dynamic A* algorithm to a large-sized map.

DISCLOSURE OF INVENTION

Technical Problem

In view of the above, the present invention provides a path search method capable of reducing an optimal path search time and being applied to a large-sized grid map by converting a grid map into a block-based block map to find a block path on the block map and finding an optimal path with respect to cells in blocks on the block path.

The present invention further provides a path search method capable of reducing an optimal path search time and being applied to a large-sized grid map by converting a preprocessed grid map into a block-based block map to find a block path in the block map and finding an optimal path with respect to cells in blocks on the block path.

Technical Solution

In accordance with a first aspect of the present invention, there is provided a path search method of a mobile object in a grid map having a plurality of cells, each having an identical size, including:

generating a block map having a plurality of blocks by merging a specific number of cells in the grid map;

obtaining a block path by finding a path from a starting position to a destination position in the block map; and obtaining a final path of the mobile object by performing a cell-based path search on cells in the blocks on the block path.

In accordance with a second aspect of the present invention, there is provided a path search method of a mobile object in a grid map having a plurality of cells, each having an identical size, including:

generating a preprocessed map by extending, based on the number of cells in the grid map occupied by the mobile object, a blocked region in the grid map;

generating a block map having a plurality of blocks by merging a specific number of cells in the preprocessed map;

obtaining a block path of the mobile object by finding a path from a starting position to a destination position in the block map; and obtaining a final path of the mobile object by performing a cell-based path search on cells in the blocks on the block path.

Advantageous Effects

In accordance with the embodiments of the present invention, the grid map is converted to the block map to find the block path and the optimal path is found with respect to the cells in the blocks on the block path. Accordingly, the search time can be reduced, and also the path search on a large-sized map can be performed in real time.

Also, since the found path, i.e., the path search result, is secured to be an optimal path, the search quality needs not to be sacrificed in order to increase the search speed.

Further, in a robot movement control using the path search method in accordance with the embodiments of the present invention, the path of the robot can be changed in real time when the robot encounters an obstacle while moving, thereby minimizing a likelihood of a collision between the robot and the obstacle which allows a flexible motion control.

Moreover, the path search in accordance with the embodiments of the present invention can be performed in real time, thereby finding paths of a number of mobile objects simultaneously. Accordingly, a number of units can be controlled flexibly in a computer game, a multi-robot control system such as a robot soccer, or the like.

BRIEF DESCRIPTION OF THE DRAWINGS

The objects and features of the present invention will become apparent from the following description of embodiments given in conjunction with the accompanying drawings, in which:

FIG. 1 illustrates a block diagram of a path search apparatus of a mobile object using a path search method in accordance with an embodiment of the present invention;

FIG. 2 illustrates a 2-dimensional grid map which is used as an input of the path search apparatus of FIG. 1;

FIG. 3 illustrates a preprocessed map generated using the grid map of FIG. 2;

FIG. 4 illustrates a block map generated using the preprocessed map of FIG. 3;

FIGS. 5 and 6 respectively illustrate a grid map and a block map for showing a problem which can occur in a block map due to a block size therefore; and FIG. 7 illustrates an experimental path search example in accordance with the embodiment of the present invention.

BEST MODE FOR CARRYING OUT THE INVENTION

Hereinafter, embodiments of the present invention will be described with reference to the accompanying drawings.

FIG. 1 illustrates a block diagram of a path search apparatus of a mobile object using a path search method in accordance with an embodiment of the present invention.

Referring to FIG. 1, the path search apparatus, which is generally installed to a mobile object, e.g., a robot, a unit, an unmanned surveillance plane, and the like, includes a preprocessing module 100, a block map generating module 110, a block path search module 120, and a final path search module 130.

The preprocessing module 100 receives a grid map which is formed of a plurality of cells each having an identical size, and changes cell states of the input grid map to thereby generate a preprocessed map. Through the preprocessing, a cell state of an empty cell into which the center of the mobile object can actually move remains the empty cell, or, the cell state thereof would be changed to a blocked cell. Therefore, if the mobile object is larger than a cell size of the grid map, in order to determine whether the center of the mobile object can actually move into a cell, it is necessary to check whether its neighboring cells are empty cells. For example, when a center of a mobile object having a diameter of, e.g., 50 cm is to move into a specific cell in a grid map having a cell size of, e.g., 10 cm×10 cm, all of the specific cell and 5×5−1 cells around the specific cell need to be empty cells. Accordingly, the preprocessing module 100 of the first embodiment decreases the empty cells (increases blocked cells), thereby changing the grid map to a preprocessed map.

There exist several methods for use in the preprocessing module 100 to preprocess the grid map based on the size of the mobile object. Below, an example of the preprocessing methods will be described.

First, when a mobile object occupies m×m (m is a natural number) grid cells, the preprocessing module 100 sets a window having a size of m×m cells which includes a center cell and its neighboring m×m−1 cells.

The preprocessing module 100 sets, while moving the window in the grid map, a center cell of the window as a blocked cell if at least one cell among m×m cells in the window is blocked, and as an empty cell if all of the m×m cells are empty. By doing so, the preprocessing module 100 performs a preprocessing on the input grid map to thereby generate a map in which blocked cells are increased.

That is, when the mobile object has a size of m×m cells, the preprocessing module 100 generates a map having a blocked region increased by (m+1)/2 cells compared to the input grid map.

For example, when the preprocessing module 100 receives an input grid map in which shaded cells form a blocked region and unshaded cells form a non-blocked region as shown in FIG. 2 and a mobile object has a size of 5×5 cells, the preprocessing module 100 changes the input grid map into a map in which the blocked region is extended as shown in FIG. 3, i.e., the preprocessed map.

The above-described preprocessing on the input grid map eliminates a need for checking states of neighboring cells in each step of a path search process, resulting in an increase of a search speed.

The block map generating module 110 receives the preprocessed map, i.e., the map having the extended blocked region, and generates a block map. The block map generating module 110 merges a specific number of neighboring cells in the preprocessed map into one block to thereby generate the block map. In generating the block map, a block including at least one empty cell is set as an empty block, and a block including only blocked cells is set as a blocked block. At this time, the block size is set to be equal to or smaller than the extended size of the blocked region in the preprocessing, i.e., the difference of the size of the blocked regions in the grid map and in the preprocessed map. For example, when the mobile object occupies m×m grid cells, the extended size of the blocked region would be (m+1)/2×(m+1)/2 cells.

A block map generating process of the block map generating module 110 using the preprocessed map of FIG. 3 will be now described in detail.

The map shown in FIG. 3 is the preprocessed map generated using the grid map of FIG. 2 in which the mobile object has a size of 5×5 cells. Thus, the block map generating module 110 sets a block size to 3×3 cells, and then, sets a block including at least one empty cell (i.e., unshaded cell) as an empty block, and a block including only blocked cells as a blocked block, thereby generating a block map of FIG. 4.

Here, the natural number m for use in defining the size of the mobile object is normally an odd value because a path search is performed by using the center of the mobile object as a reference point.

As described above, the block size and the block state (i.e., empty or blocked) setting scheme are key parameters in generating the block map by the block map generating module 110. The parameters are required to be set such that the mobile object moving along the path does not fail to move into an available region (empty cells) or try to pass through an unavailable region (blocked cells). In accordance with the first embodiment, since a block including at least one empty cell is set as an available block, the mobile object does not fail to move into the available region. Meanwhile, setting the path to prevent the mobile object from trying to pass through the unavailable region is closely correlated with the block size setting. When the block size is large, the block path search time can be reduced, but blocked cells in the input grid map can be set as empty cells in the block map, resulting in losing original space information (see FIGS. 5 and 6).

FIG. 5 illustrates a cell-based grid map, and FIG. 6 illustrates a block map which has a block size of 2×2 cells and is generated from the grid map of FIG. 5. In case of finding a path from a starting position A to a destination position B as shown in FIG. 5, since the original space information (i.e., information on obstacles) is lost in the block map of FIG. 6, the path is set to lead the mobile object to directly move from the starting position A to the destination position B, as indicated by an arrow in FIG. 6.

Accordingly, the block size is set to be equal to or smaller than (m+1)/2×(m+1)/2 cells. This is because the blocked region in the grid map is extended through the preprocessing process. For example, there exists a laterally extended blocked region having a thickness of one cell at the center portion of the grid map of FIG. 2, but the thickness of the blocked region is changed into a thickness of m cells through the preprocessing process as shown in FIG. 3. At this time, since the sum of vertical lengths of a block including blocked cells and a block (neighboring block) adjacent thereto in the upper or lower direction corresponds to 2×(m+1)/2=m+1 cells, one of the two blocks is necessarily made to be completely contained in the blocked region irrespective of a location of the boundary between the two blocks.

The block map generated through the above process is input to the block path search module 120, which finds a block path from a starting position to a destination position in the block map. To be specific, when the centers of the mobile object at the starting position and at the destination position are respectively located on cell S and cell D in the grid map, the block path search module 120 sets the starting block and the destination block in the block map to a block including the cell S and a block including the cell D, respectively. After that, the block path search module 120 obtains a block path from the starting block to the destination block using one of path search algorithms which secure an optimal solution, such as the A* algorithm, the Dijkstra D* algorithm, a breadth-first graph search algorithm, a depth-first graph search algorithm, and the like.

The block path obtained by the block path search module 120 is input to the final path search module 130, and the final path search module 130 performs path search on cells in the blocks on the obtained block path to thereby obtain a cell-based final path. More specifically, the final path search module 130 limits searching target cells to the cells in the blocks on the block path, and performs a path search on the searching target cells in the preprocessed grid map using one of the above-described path search algorithms.

According to the present invention, the grid map is preprocessed before generating the block map, and the block path and the final path searches are performed using the block map. However, alternatively, the block map may be generated from the grid map without performing thereon the preprocessing. In this regard, a block including only empty cells is set to an empty block, and a block including at least one blocked cell is set to a blocked block.

The alternative embodiment of the present invention can be preferably applied to a case where the empty region in the grid map has an average width much greater than the size of the mobile object.

FIG. 7 illustrates an experimental path search example in accordance with the embodiments of the present invention. The experiment was performed using a 3 GHz Pentium personal computer, and the mobile object size and the block size were set to 7×7 cells and 4×4 cells, respectively. In the experimental result, a search time for a path from a starting position P to a destination position Q was 0.047 seconds, which is faster than, by 450 times, a processing time (21.234 seconds) using the A* algorithm under the same experimental conditions.

In accordance with the embodiments of the present invention, the preprocessed grid map (in case of the first embodiment) or the input grid map (in case of the second embodiment) is divided into blocks, each having a specific size, to generate the block map. Based on the block map, the block path is obtained and then the final path search is performed on cells in the blocks on the block path. Accordingly, the search speed can be improved.

The embodiments of the present invention further include the preprocessing step and/or the block map generating step, which are not included in conventional techniques. However, the preprocessing step and the block map generating step need to be performed only once throughout the whole path search procedure. Therefore, it should be noted that the processing time for the preprocessing step and/or the block map generating step hardly affect an overall path search time.

While the invention has been shown and described with respect to the embodiments, it will be understood by those skilled in the art that various changes and modifications may be made without departing from the scope of the invention as defined in the following claims.

The invention claimed is:

1. A path search method of a mobile object in a grid map having a plurality of cells, each having an identical size, comprising:
   generating a block map having a plurality of blocks by merging a specific number of cells in the grid map to create each block;
   obtaining a block path by finding a path from a starting position to a destination position in the block map; and
   obtaining a final path of the mobile object by performing a cell-based path search on cells in the blocks on the block path,
   wherein generating a block map includes:
   setting a block size based on the number of cells in the grid map occupied by the mobile object;
   dividing the grid map into the blocks each having the block size; and
   setting, based on cell states of the cells in each of the blocks in the block map, a block state for each of the blocks as either a blocked block or an empty block.

2. The method of claim 1, wherein when the mobile object occupies m×m cells in the grid map, the block size is set to be equal to or smaller than (m+1)/2×(m+1)/2 cells.

3. The method of claim 1, wherein in setting a block state, the block state is set to the empty block if the block has only empty cells, and the block state is set to the blocked block if the block has at least one blocked cell.

4. A path search method of a mobile object in a grid map having a plurality of cells, each having an identical size, comprising:

generating a preprocessed map by extending, based on the number of cells in the grid map occupied by the mobile object, a blocked region in the grid map to create each block;

generating a block map having a plurality of blocks by merging a specific number of cells in the preprocessed map to create each block;

obtaining a block path of the mobile object by finding a path from a starting position to a destination position in the block map; and obtaining a final path of the mobile object by performing a cell-based path search on cells in the blocks on the block path, wherein generating a preprocessed map includes:

setting a window size W to the number of cells occupied by the mobile object such that a window has a center cell and W−1 neighboring cells; and setting, while moving the window in the grid map, a cell state for each of the center cells in the window to an empty cell if all of the center cell and neighboring cells are the empty cells, and to a block cell if at least one of the center cell and neighboring cells is the blocked c, wherein generating a block map includes:

setting a block size based on the number of cells in the grid map occupied by the mobile object;

dividing the preprocessed map into the blocks each having the block size; and setting, based on cell states of the cells in each of the blocks in the block map, a block state for each of the blocks as either a blocked block or an empty block.

5. The method of claim 4, wherein generating a preprocessed map includes:

setting a window size W to the number of cells occupied by the mobile object such that a window has a center cell and W−1 neighboring cells; and setting, while moving the window in the grid map, a cell state for each of the center cells in the window to an empty cell if all of the center cell and neighboring cells are the empty cells, and to a block cell if at least one of the center cell and neighboring cells is the blocked cell.

6. The method of claim 4, wherein the block size is set to be equal to or smaller than a difference of the size of the blocked regions in the grid map and in the pre-processed map.

7. The method of claim 6, wherein when the mobile object occupies m×m cells in the grid map, the difference of the size of the blocked regions is set to (m+1)/2 cells.

8. The method of claim 4, wherein in setting a block state, the block state is set to the blocked block if the block has only blocked cells, and the block state is set to the empty block if the block has at least one empty cell.

* * * * *